United States Patent [19]

Misaki et al.

[11] Patent Number: 5,005,010
[45] Date of Patent: Apr. 2, 1991

[54] HEAD-UP DISPLAY FOR MOTOR VEHICLES

[75] Inventors: Takashi Misaki, Susono; Hitoshi Aoki, Numazu, both of Japan

[73] Assignee: Yazaki Corporation, Japan

[21] Appl. No.: 169,695

[22] Filed: Mar. 18, 1988

[30] Foreign Application Priority Data

Mar. 18, 1987 [JP] Japan ................. 62-038509

[51] Int. Cl.$^5$ ............................................. G09G 3/02
[52] U.S. Cl. .................................. 340/705; 340/980; 350/174; 353/14
[58] Field of Search .............. 340/705, 971, 980, 763, 340/796, 97, 98; 353/11, 12, 13, 14, 61, 68; 350/171, 174, 331 T, 331 R, 257, 407, 277, 279, 276 R; 358/103, 109, 250; 73/178 R

[56] References Cited

U.S. PATENT DOCUMENTS

| | | | |
|---|---|---|---|
| 4,151,411 | 4/1979 | Derderian et al. | 350/407 |
| 4,687,072 | 8/1987 | Komuro | 340/705 |
| 4,711,544 | 12/1987 | Iino et al. | 353/14 |
| 4,742,389 | 5/1988 | Schiffman | 340/705 |
| 4,787,711 | 11/1988 | Suzuki | 350/174 |
| 4,804,836 | 2/1989 | Iino | 340/705 |
| 4,831,366 | 5/1989 | Iino | 340/705 |
| 4,837,551 | 1/1989 | Iino | 340/705 |
| 4,886,328 | 12/1989 | Iino | 340/705 |
| 4,908,611 | 3/1990 | Iino . | |

*Primary Examiner*—Alvin E. Oberley
*Assistant Examiner*—M. Fatahi-Yar
*Attorney, Agent, or Firm*—Wigman & Cohen

[57] ABSTRACT

Disclosed herein is a head-up display for a motor vehicle having a dashboard with a top surface, which comprises a projector enclosed in the dashboard, the projector including a light source, an object from which visual information is to be displayed and a lens, an aperture formed on the top surface of the dashboard which is covered by the lens or a transparent member for preventing dust or the like from entering thereinto, a reflecting member provided in front of a driving seat on which light projected from the projector through the aperture is reflected to produce the image of the visual information thereon, and a reflection preventing member for preventing the reflection of light entering from the outside of the vehicle on the lens of the projector or on the transparent member. An antireflection coating such as a black paint is applied on the upper surface of the reflection preventing member. The reflection preventing member being shiftable between a first position in which the member covers the lens or the transparent member to close the aperture and a second position in which the member uncovers the lens or the transparent member to open the aperture. The reflection preventing member is shifted to the second position from the first position only when the head-up display is employed. Accordingly, it can prevent external light from being reflected on the lens or the transparent member toward eyes of the driver of the vehicle.

11 Claims, 5 Drawing Sheets

HEAD-UP DISPLAY FOR MOTOR VEHICLES

BACKGROUND OF THE INVENTION

1. Field of the Invention

This invention relates to a head-up display for motor vehicles, in particular to a head-up display having a projector enclosed in a dashboard of a motor vehicle, in which an image of an object is projected through an aperture provided at the top of the dashboard onto a reflecting member such as a front windshield provided in front of the driver's seat of the motor vehicle, whereby a driver can observe the visible information of the image produced thereon.

2. Description of the Prior Art

Referring now to the drawings in FIGS. 1 and 2, the structures of two types of conventional head-up displays are explained.

FIG. 1 shows the basic structure of one of these conventional head-up displays, which has a projector 5 enclosed in a dashboard 1 arranged in front of the driver's seat. The dashboard 1 has an aperture 1a provided at the top of the dashboard 1. The projector 5 comprises a light source 2, a liquid crystal display 3, and a lens 4 covering the aperture 1a. In the projector 5, an image of the liquid crystal display 3 is projected onto the front windshield serving as the reflecting member 7 through the aperture 1a, and a driver 9 can observe a virtual image 6 produced in front of the front windshield 7.

FIG. 2 shows the basic structure of the other conventional head-up display. In this head-up display, a projector 5 is also enclosed in a dashboard 1 which has an aperture 1a provided at the top thereof. The aperture 1a is covered by a transparent cover 11. Although the projector 5 is formed as a unit type, the internal structure thereof is in common with that of the head-up display shown in FIG. 1. The unit type projector 5 is mounted with rotation capabilities with respect to an axis 10 in the dashboard 1, so that it is possible to adjust the position of the image 6 on the front windshield 7 so as to reflect the visual image to a position where the eyes of a driver 9 are normally directed during operation of the vehicle.

In these conventional head-up displays, the aperture 1a formed on the top of the dashboard 1 is either covered by a lens 4, as in FIG. 1, or by the transparent cover 11 as in FIG. 2 for protecting the lens 4 or for preventing dust from entering into the projector compartment.

In the apertures 1a of both these structures, however, the surfaces of the lens 4 and the transparent cover 11 are usually formed by mirror grinding methods in order to improve the display performance. Therefore, there was the problem that the visibility of the driver is impaired by the reflection of external light entered from the outside, such as sunlight, on the surface of the lens 4 or the transparent cover 11 not only in the employment of the head-up display but also in the unemployment thereof.

In order to overcome this problem, one can conceivably apply antireflection treatment, such as creating fine irregularities or masking, to the surface of the lens 4 or the transparent cover 11. However, such antireflection treatment has, a disadvantage in that it also reduces the quantity of projected light available for display, thereby deteriorating the display capability of the head-up display.

SUMMARY OF THE INVENTION

Accordingly, one of the main objectives of the present invention is to provide a head-up display which can prevent the reflection of external light from the transparent member such as a lens or transparent cover without reducing the quantity of projected light from the projector.

Another objective of the present invention is to provide a head-up display which can prevent dust from entering into the projector and also protect the lens from intensive light from the outside.

Still another objective of the present invention is to provide a head-up display which can protect an indication device, such as a liquid crystal display, in the projector from intensive light from the outside.

In order to achieve the above objectives, the head-up display for motor vehicles having a dashboard with a top surface thereof according to the present invention comprises a transparent member provided on the top surface of the dashboard, means for projecting an image of visual information through said transparent member, and said projecting means being enclosed in said dashboard, reflection means for producing the image of the visual information thereon, and means for preventing reflection of light entering from the outside of said vehicle on said transparent member, said reflection preventing means being shiftable between a first position covering said transparent member and a second position uncovering said transparent member.

In accordance with the head-up display of the present invention having the above structure, since there is provided the reflection preventing means which is shiftable between the first position covering said transparent member and the second position uncovering said transparent member, it will prevent intensive light from the outside from being reflected on the transparent member. Therefore, it is possible to prevent the reflection of the intensive light which impairs the vision of the driver on the transparent member.

Furthermore, the reflection preventing means may be constructed so as to enable the transparent member to be covered when intensive light enters into the projector, so that it becomes possible to protect the lens in the projector from such intensive light. Furthermore, with the provision of the reflection preventing means, it also becomes possible to prevent dust and other small particles from entering into the projector. Moreover, since the reflection preventing means is provided on the dashboard, the structure of the projector is not affected by the provision of the reflection preventing means, thereby allowing compactification of the apparatus to be attained.

These and the other objects, features and advantages of the present invention will be more apparent from the following description of preferred embodiments, taken in conjunction with the accompanying drawings, in which:

BRIEF DESCRIPTION OF THE DRAWINGS

FIGS. 4(a) and (b) are explanatory drawings for explaining the operation of the reflection preventing means of the first embodiment, in which FIG. 4(a) shows a condition in which the head-up display is employed and FIG. 4(b) shows a condition in which the head-up display is not employed.

FIGS. 7(a) and (b) are explanatory drawings of the second embodiment, in which FIG. 7(a) shows a condition in which the head-up display is employed and FIG. 7(b) shows a condition in which the head-up display is not employed

DETAILED DESCRIPTION OF THE PREFERRED EMBODIMENTS

Figure 1:
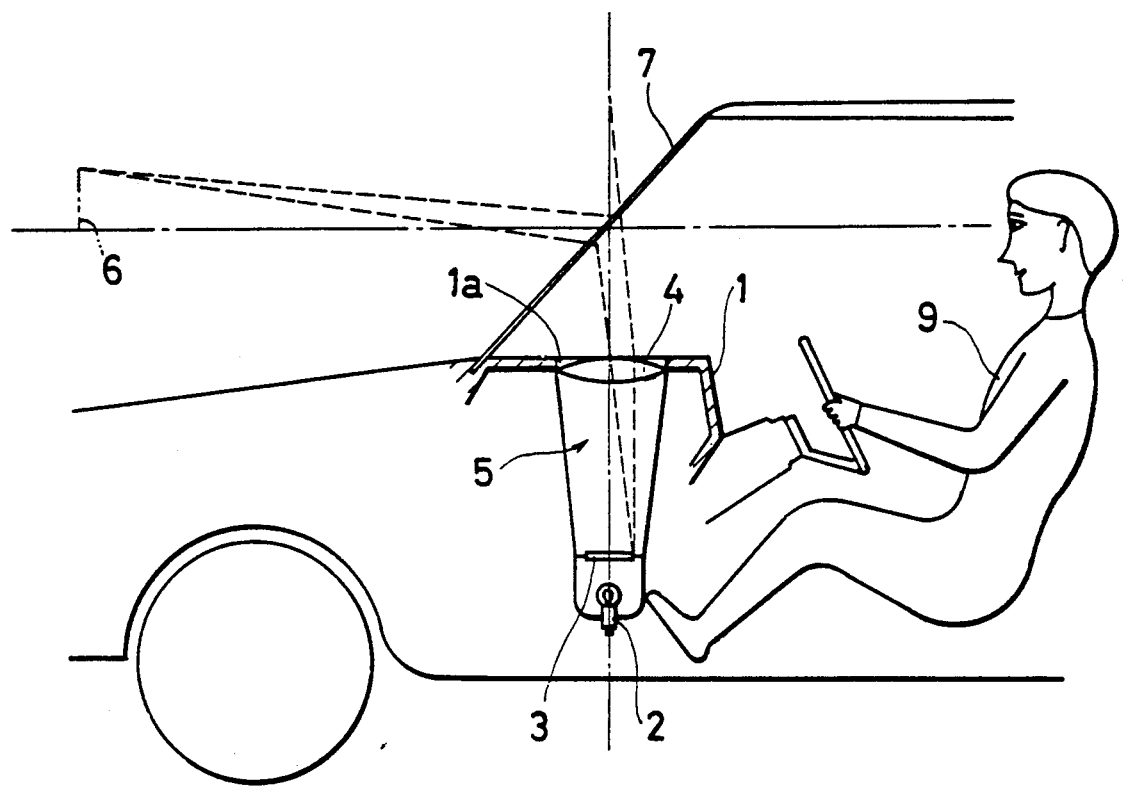
FIG. 1 is a schematic diagram showing one type of conventional head-up display for motor vehicles.

Referring now to the drawings, the embodiments of the present invention are described as follows.

Figure 2:
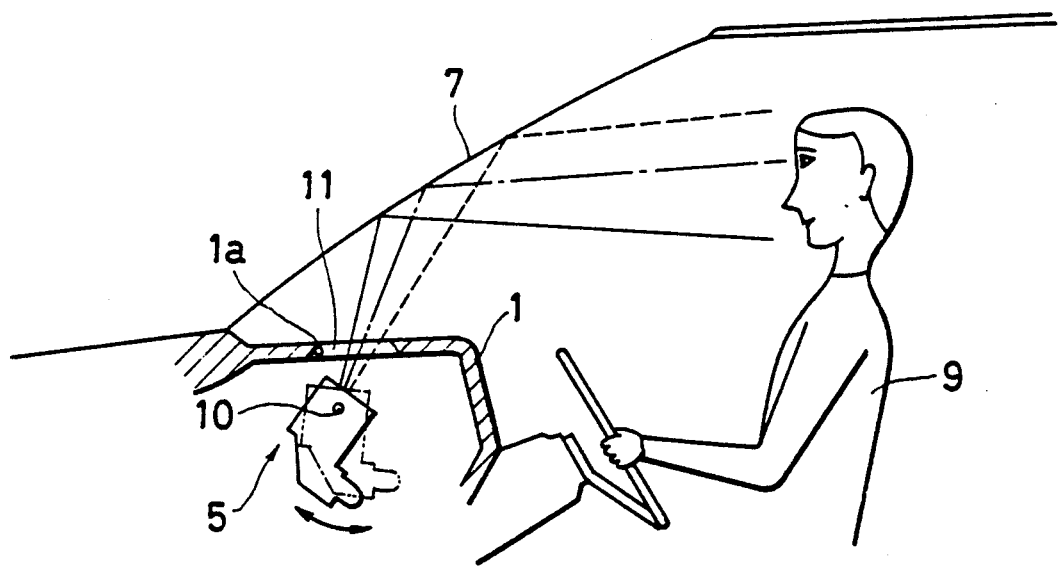
FIG. 2 is a schematic diagram showing another type of conventional head-up display for motor vehicles.
Figure 3:
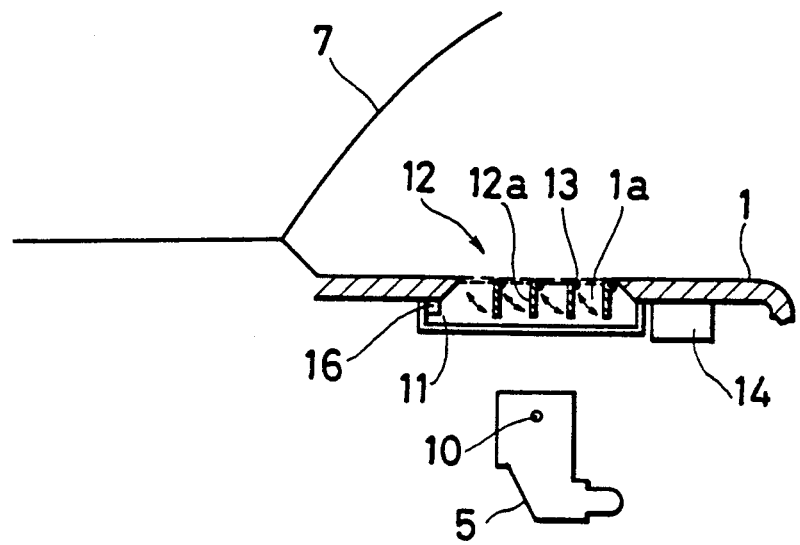
FIG. 3 is a schematic diagram showing the first embodiment of the present invention.

FIG. 3 shows the first embodiment of the present invention. In the drawing, the numeral 1 denotes a dashboard 1 of a motor vehicle. In the dashboard 1, there is provided a projector 5 which is rotatably mounted on an axis 10. The projector 5 comprises a light source, a liquid crystal display and a lens and so forth (not shown), as described in conjunction with the conventional head-up display of FIG. 2.

The dash board 1 has an aperture 1a on the top surface thereof. On the underside of the aperture 1a, there is provided a transparent member such as a transparent cover 11 for preventing dusts from entering the projector 5, which covers the aperture 1a. The transparent cover 11 is formed of a synthetic resin such as acryl and has a U-shape in cross sectional thereof as shown in the drawing. The upper surface of the transparent cover 11 is formed by mirror grinding method. The transparent cover 11 is attached on the underside of the dashboard 1a with some distance therebetween. In the drawing, the numeral 7 denotes a front windshield as reflection means, on which an image of visual information in the liquid crystal display is produced.

Reflection preventing means 12 for light coming from the outside is provided in the aperture 1a. The reflection preventing means 12 comprises a plurality of visors 12a. Each of the visors 12a is pivotably supported by a support rod 13 which is mounted between the opposite edges of the aperture 1a. On the upper surface of each visor 12a, reflection preventing treatment such as fine irregularities or black paint is applied. Each of the visors 12a can be pivotally turned between their horizontal and vertical positions with respect to the top surface of the dashboard 1. As a result, the visors 12a completely close the aperture 1a when rotated to their horizontal position and fully open the aperture 1a when rotated to their vertical position.

Figure 4A:
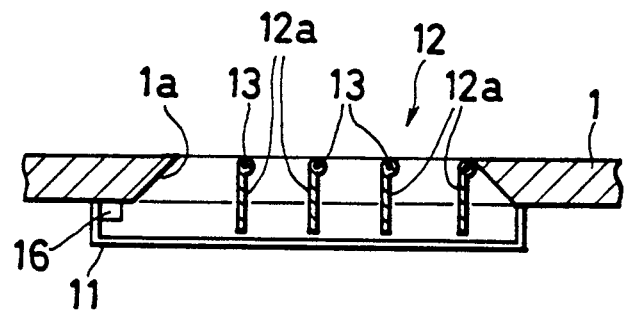
Figure 4B:
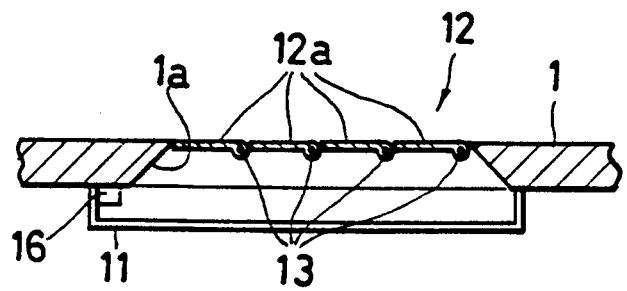

FIG. 4 (a) and (b) show operations of the visors 12. When the projector 5 is in operation, the visors 12a are rotated to their vertical positions to open the aperture 1a, as shown in FIG. 4(a). On the other hand, when the projector 5 is not in operation or when visual information from the object is not required, then the visors 12a are turned to their horizontal positions to close the aperture 1a, as shown in FIG. 4(b). The visors 12a are actuated by drive means 14 (FIG. 3). The details of the drive means 14 are omitted because the drive means 14 is an ordinary mechanism which comprises a motor, drive gears, driven gears, and so forth.

Figure 5:
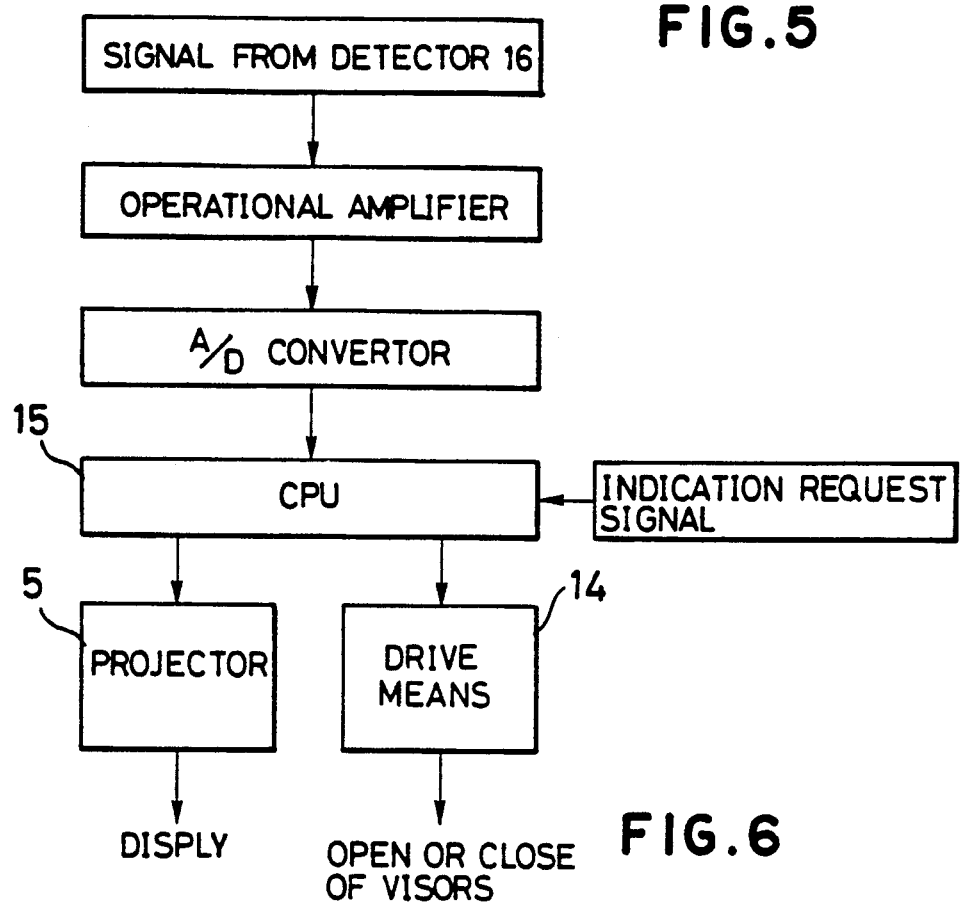
FIG. 5 is a block diagram showing the control system for operating the reflection preventing means

FIG. 5 shows a control system for the reflection preventing means 12 (FIG. 3). For example, the visors 12a are first located at their horizontal positions to close the aperture 1a, as shown in FIG. 4(b). Then, an indication request signal is inputted to the controller 15 including a central processing unit (CPU), the drive means 14 is actuated by a signal outputted from the CPU 15, and then each visor 12a is rotated with respect to the support axis 13 and turned to its vertical position, thereby opening the aperture 1a. Simultaneously, the indication signal is also sent to the projector 5 (FIG. 3) from the CPU 15, which activates the liquid crystal display and the light source in the projector 5 in order to project visual information from the liquid crystal display onto the front windshield 7 serving as the reflecting member. As a result, a driver can observe the visible information 6 (FIG. 1) produced on the front windshield 7. When the projector 5 is turned off, an indication request signal is sent to the CPU 15 to drive the drive means 14 which then turns the visors 12a to their horizontal positions thereby closing the aperture 1a, as shown in FIG. 4(b).

In addition, if intensitive light enters into the projector 5 from the outside during the operation of the projector 5 or if the quantity of reflected light from the transparent member 11 is large, a detector 16, which is provided inside the projector 5 or outside thereof for detecting the quantity of external light and outputting a signal. The signal is amplified by an operational amplifier and the amplified signal is inputted to the CPU 15 through an A/D converter. By this signal, the drive means 14 is also actuated to move the visors 12a to their horizontal positions, thereby closing the aperture 1a. Therefore, it is possible to protect the indication device such as the liquid crystal display from this intensive light and to prevent the reflection of light from the transparent member 11 which can impair the vision of the driver.

Figure 6:
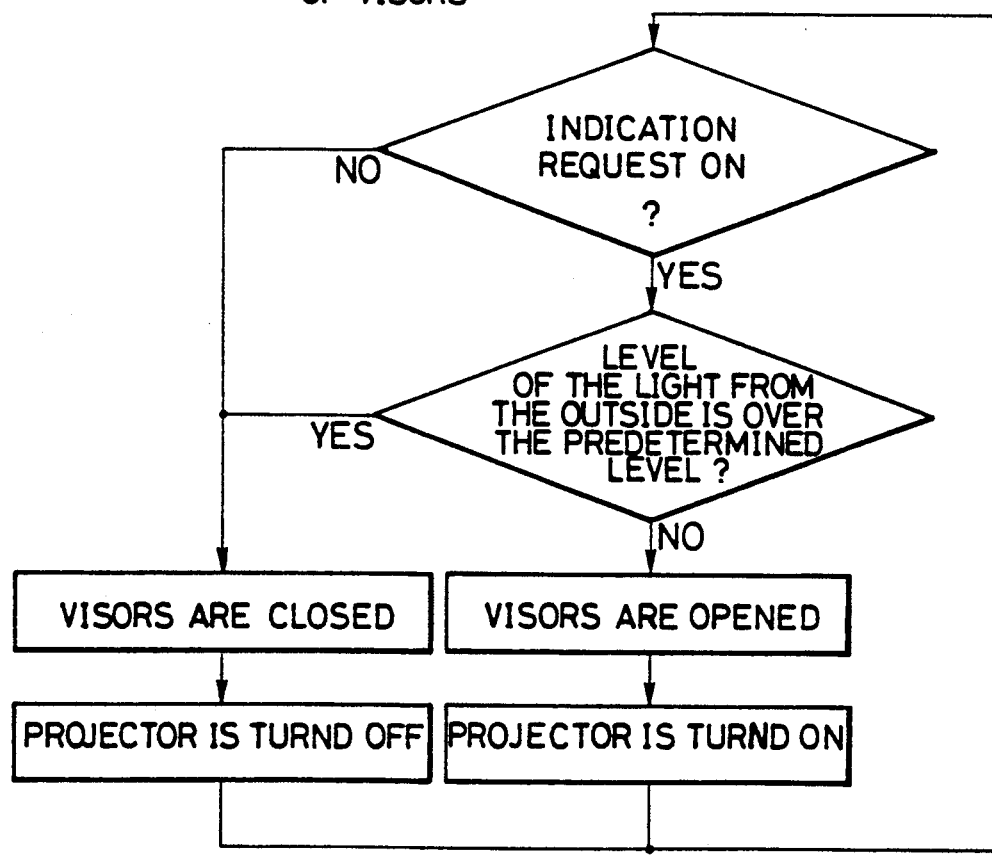
FIG. 6 is a flow diagram explaining the operation of the control system.

FIG. 6 is a flow diagram showing the operation of the CPU 15. At first, it is decided whether an indication request signal is on or off. When the signal is on, then the process is advanced to the next step and then it is decided whether level of the light from the outside is over the predetermined level or not. When the level of the light from the outside is under the predetermined level, then the visors 12 are rotated to their vertical positions to open the aperture 1a and simultaneously the projector 5 is turned on. On the other hand, when the indication request signal is off, the visors 12 are turned to their horizontal positions to close the aperture 1a and simultaneously the projector 5 is turned off. In addition, when the level of the light from the outside is over the predetermined level, then the visors 12 are also turned to their horizontal positions to close the aperture 1a and simultaneously the projector 5 is turned off.

Figure 7A:
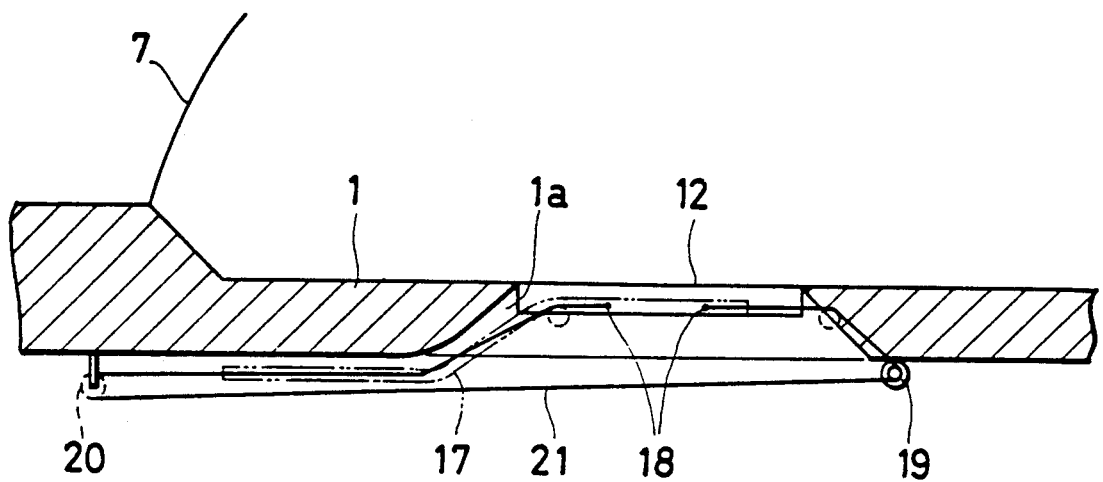
Figure 7B:
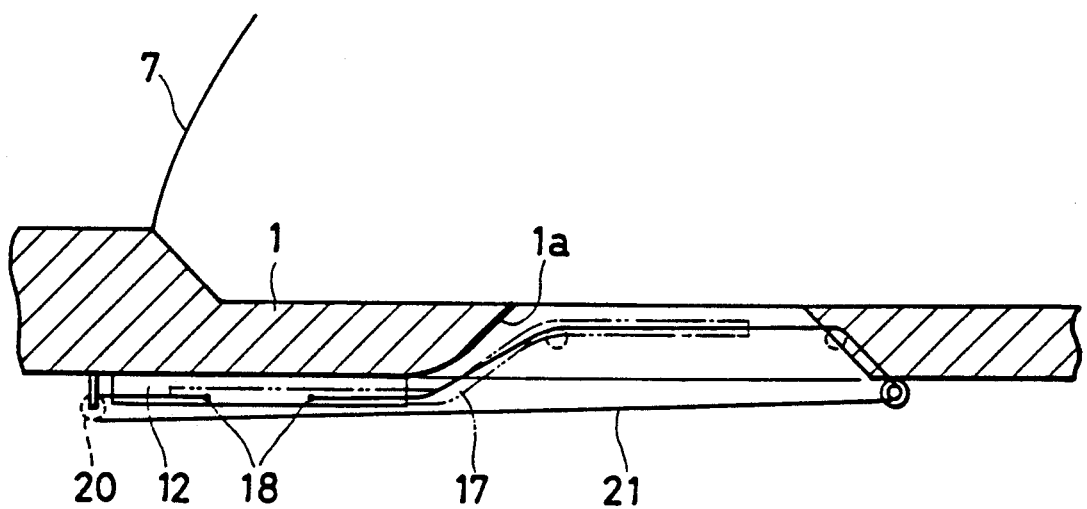
Figure 8:
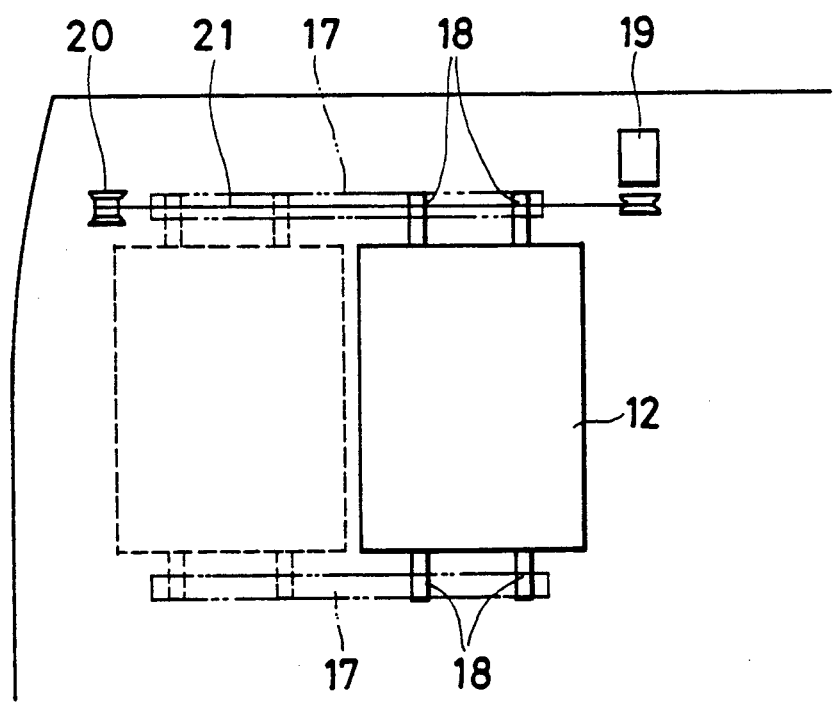
FIG. 8 is a overhead view of the second embodiment.

FIGS. 7 and 8 show a second embodiment of the present invention. In this embodiment, a reflection preventing means 12 comprises a sheet of a flexible plate like member or a flexible sheet like member having an substantially square shape, and the upper surface thereof is coated with an antireflection coating such as fine irregularities or black paint. Said plate like member 12 has a sliding door structure which can move between a first position in which the plate like member 12 covers and closes the aperture 1a and a second position in which the plate like member 12 slides under the top surface of the dashboard and opens the aperture 1a. Specifically, on the underside of the dashboard 1, a pair of guide rails 17 are provided along the opposite sides of the aperture 1a, respectively. On the opposite sides of the plate like member 12 there is provided a plurality of pins 18, respectively. The pins 18 of each side of the plate like member 12 are slidably engaged with each guide rail 17, respectively. A belt 21, which is interconnected between a pulley attached to a rotating shaft of a motor 19 and a pulley 20, is coupled to the pins 18 of one side of the plate like member 12. Accordingly, the rotational force of the motor 19 is transmitted to the pins 18 by means of belt 21, so that the plate like member 12 can be moved between the first position and the second position in accordance with the movement of the pins 18 which are moved by the rotational force of the motor 19. The controlling mechanism for the movement of the plate like member 12 as the reflection preventing means is same as that of the first embodiment.

In accordance with the second embodiment, there is the additional advantage that the structure of the reflection preventing means 12 becomes simpler than that of the first embodiment, since the reflection preventing means 12 comprises a plate like member. Further, while in the structure of the first embodiment the images of the support rods may obstruct the projected visual information, in the structure of this embodiment there is no fear of such obstruction.

It will become apparent from the foregoing description that the head-up display of the present invention has a number of advantages, some of which have been described above. Also, obvious modifications and variations can be made to the head-up display of the present invention without departing from the scope of the invention. Accordingly, the scope of the invention is not limited as necessitated by the accompanying claims.

What is claimed is:

1. A head-up display for a motor vehicle having a dashboard with a top surface which is provided with an aperture, which comprises:
    a transparent member provided within said aperture in said top surface of said dashboard;
    means for projecting an image of visual information through said transparent member provided in said aperture, said projecting means being enclosed in said dashboard;
    reflection means for producing the image of the visual information thereon; and
    means for preventing reflection of light entering from the outside of said vehicle on said transparent member, said reflection preventing means being associated with said aperture and shiftable between a first position covering said transparent member by closing said aperture and a second position uncovering said transparent member by opening said aperture.

2. A head-up display as claimed in claim 1, wherein said head-up display further comprises means for shifting said reflection preventing means between said first and second positions.

3. A head-up display as claimed in claim 2, wherein said reflection preventing means is shifted to said second position from said first position by said shifting means only when said head-up display is employed.

4. A head-up display as claimed in claim 3, wherein said head-up display further comprises control means for controlling the shift of the reflection preventing means and the operation of said projecting means, and said control means comprises means for generating output signals connected with a central processing unit wherein said central processing unit is operated by indication request signals inputted by said means for generating an indication request signal and output signals for operating said projecting means and for driving said shifting means.

5. A head-up display as claimed in claim 4, wherein said reflection preventing means is shifted to said first position from said second position by said shifting means when intensive light enters from the outside into said projecting means or when the quantity of the reflected light on said transparent member is too large during the employment of said head-up display.

6. A head-up display as claimed in claim 5, wherein said control means further comprises a sensor for detecting the quantity of light entering into said projecting means or reflected on said transparent member and said sensor being outputting a signal in accordance with the quantity of the detected light, and said signal is inputted into said central processing unit, then said central processing unit outputs a signal for shifting said reflection preventing means from said second position to said first position.

7. A head-up display as claimed in claim 1, wherein said reflection preventing means comprises at least one visor means having an upper surface and located above said transparent member, and an antireflection coating being applied on said upper surface.

8. A head-up display as claimed in claim 7, wherein said antireflection coating includes a black paint.

9. A head-up display as claimed in claim 7, wherein said antireflection coating includes fine irregularities.

10. A head-up display as claimed in claim 7, wherein said visor means comprises a plurality of visors pivotally mounted on said aperture, in which in said first position said visors are adjusted to be directed horizontally to said top surface of said dashboard and close said aperture and in said second position said visors are adjusted to be directed vertically to said top surface of said dashboard and to open said aperture.

11. A head-up display as claimed in claim 7, wherein said visor means comprises a flexible plate-like member, in which in said first position said plate-like member covers said transparent member and closes said aperture and in said second position said plate-like member slidingly moves under the upper surface of the dashboard to uncover said transparent member and open said aperture.

* * * * *